(12) United States Patent
Loentgen et al.

(10) Patent No.: US 10,935,163 B2
(45) Date of Patent: Mar. 2, 2021

(54) CONTROLLING THE BUOYANCY OF A MASS OF BUOYANT SPHERES

(71) Applicant: Acergy France SAS, Suresnes (FR)

(72) Inventors: Vincent Loentgen, Chambry (FR); Blaise Seguin, Suresnes (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 16/308,450

(22) PCT Filed: Jun. 8, 2017

(86) PCT No.: PCT/IB2017/000854
§ 371 (c)(1),
(2) Date: Dec. 7, 2018

(87) PCT Pub. No.: WO2017/212340
PCT Pub. Date: Dec. 14, 2017

(65) Prior Publication Data
US 2019/0178417 A1   Jun. 13, 2019

(30) Foreign Application Priority Data

Jun. 10, 2016 (GB) .................................. 1610161.0

(51) Int. Cl.
*F16L 1/24* (2006.01)
*B63G 8/24* (2006.01)
(Continued)

(52) U.S. Cl.
CPC .............. *F16L 1/163* (2013.01); *E02B 17/00* (2013.01); *E02B 2017/0039* (2013.01)

(58) Field of Classification Search
CPC .. F16L 1/163; F16L 1/24; E02B 17/00; E02B 2017/0039; E21B 17/012; B63G 8/24; B63C 7/08; B63B 22/24; B63B 3/13
(Continued)

(56) References Cited

U.S. PATENT DOCUMENTS 1,828,694 A * 10/1931 Winkler .................... B63C 7/12
114/50
2,724,132 A * 11/1955 Shoup ..................... B63B 43/12
114/360
(Continued)

FOREIGN PATENT DOCUMENTS

FR  2 572 986   5/1986
FR  2 911 382   7/2008
(Continued)

*Primary Examiner* — Edwin J Toledo-Duran
(74) *Attorney, Agent, or Firm* — Levy & Grandinetti

(57) ABSTRACT

A buoyant element for conferring buoyancy on a subsea structure or apparatus has a floodable envelope that contains a mass of buoyant spheres and a void extending between the spheres. Openings penetrate the envelope, in fluid communication with the void. One or more one destruction devices are arranged to destroy at least one of the spheres within the envelope in use. After the envelope has been submerged and flooded to fill the void between the spheres with water, the destruction devices are imploded to create shockwaves that expand the void by sympathetic implosion of the spheres. Additional water is admitted into the envelope through the openings to fill the expanding void, thereby ballasting the buoyant element.

19 Claims, 7 Drawing Sheets

(51) Int. Cl.
*B63G 7/08* (2006.01)
*F16L 1/16* (2006.01)
*E02B 17/00* (2006.01)

(58) Field of Classification Search
USPC ........ 61/46.5, 46, 69; 114/16, 16 E, 50, 5 T, 114/206, 333; 405/203–207
See application file for complete search history.

(56) References Cited

U.S. PATENT DOCUMENTS

| | | | | |
|---|---|---|---|---|
| 3,605,670 | A * | 9/1971 | Dzikowski | B63G 8/24 114/331 |
| 3,792,979 | A * | 2/1974 | Clinton | C02F 1/688 422/265 |
| 3,855,803 | A * | 12/1974 | Lacroix | E02B 3/06 405/206 |
| 3,879,952 | A * | 4/1975 | Mo | E02D 23/02 405/207 |
| 3,920,883 | A * | 11/1975 | Yamada | A61K 8/03 514/762 |
| 4,052,862 | A | 10/1977 | Lamy | |
| 4,081,970 | A * | 4/1978 | Dowse | E02D 29/06 405/204 |
| 4,189,786 | A * | 2/1980 | Adler | B63B 22/14 367/133 |
| 4,336,662 | A * | 6/1982 | Baird | E02F 5/006 37/314 |
| 4,451,260 | A * | 5/1984 | Mitra | A61K 9/0065 424/443 |
| 4,458,576 | A | 7/1984 | Ayers | |
| 4,458,618 | A * | 7/1984 | Tuffier | B63B 43/12 114/360 |
| 4,606,893 | A * | 8/1986 | Sangster | B01F 1/0027 116/200 |
| 4,745,860 | A * | 5/1988 | Reymann | A63H 23/12 102/354 |
| 4,955,945 | A * | 9/1990 | Weick | A61M 15/0011 128/203.12 |
| 4,974,995 | A | 12/1990 | Ayers | |
| 5,351,831 | A * | 10/1994 | Gouge | C05G 5/40 206/524.7 |
| 5,956,061 | A * | 9/1999 | Ahn | B41J 2/17513 347/87 |
| 6,032,495 | A * | 3/2000 | Leu | D06F 39/024 510/439 |
| 6,285,126 | B1 * | 9/2001 | Evans | H01J 61/28 313/550 |
| 6,430,108 | B1 * | 8/2002 | Pignol | B63G 9/02 367/145 |
| 8,636,101 | B2 * | 1/2014 | Elmer | E02B 17/0017 181/175 |
| 2003/0148003 | A1 * | 8/2003 | Wright | B65D 81/3222 426/115 |
| 2004/0115003 | A1 * | 6/2004 | Johnston | E02B 15/0807 405/63 |
| 2004/0175334 | A1 * | 9/2004 | MacKinnon | A61K 8/11 424/58 |
| 2005/0109695 | A1 * | 5/2005 | Olivier | B01F 5/0212 210/605 |
| 2008/0245627 | A1 * | 10/2008 | Battlogg | F16F 9/22 188/267.2 |
| 2009/0186130 | A1 * | 7/2009 | Butler | A23K 40/00 426/96 |
| 2010/0143042 | A1 | 6/2010 | Truong Dinh et al. | |
| 2011/0217711 | A1 * | 9/2011 | Hiddessen | C12Q 1/686 435/6.12 |
| 2012/0040774 | A1 * | 2/2012 | Alan | A63B 37/0023 473/352 |
| 2012/0253000 | A1 * | 10/2012 | Okawa | C09B 67/0097 526/340.3 |
| 2012/0317867 | A1 * | 12/2012 | Houghton | A01K 97/02 43/44.99 |
| 2013/0023748 | A1 * | 1/2013 | Afanasewicz | A61B 5/6814 600/386 |
| 2013/0049237 | A1 * | 2/2013 | Al-Anzi | A01K 97/02 261/120 |
| 2013/0053612 | A1 * | 2/2013 | Al-Anzi | B01F 3/04099 588/250 |
| 2013/0202749 | A1 * | 8/2013 | Yauk | B65D 85/73 426/115 |
| 2016/0073679 | A1 * | 3/2016 | Rushforth | A24F 23/00 131/310 |
| 2017/0064994 | A1 * | 3/2017 | Xu | B65D 25/08 |
| 2017/0073052 | A1 * | 3/2017 | Agapiades | B63C 9/19 |
| 2018/0073665 | A1 * | 3/2018 | Bombino | F16L 1/163 |

FOREIGN PATENT DOCUMENTS

| | | |
|---|---|---|
| GB | 1153248 | 5/1969 |
| GB | 1396496 | 6/1975 |
| JP | 2007-126060 | 5/2007 |

* cited by examiner

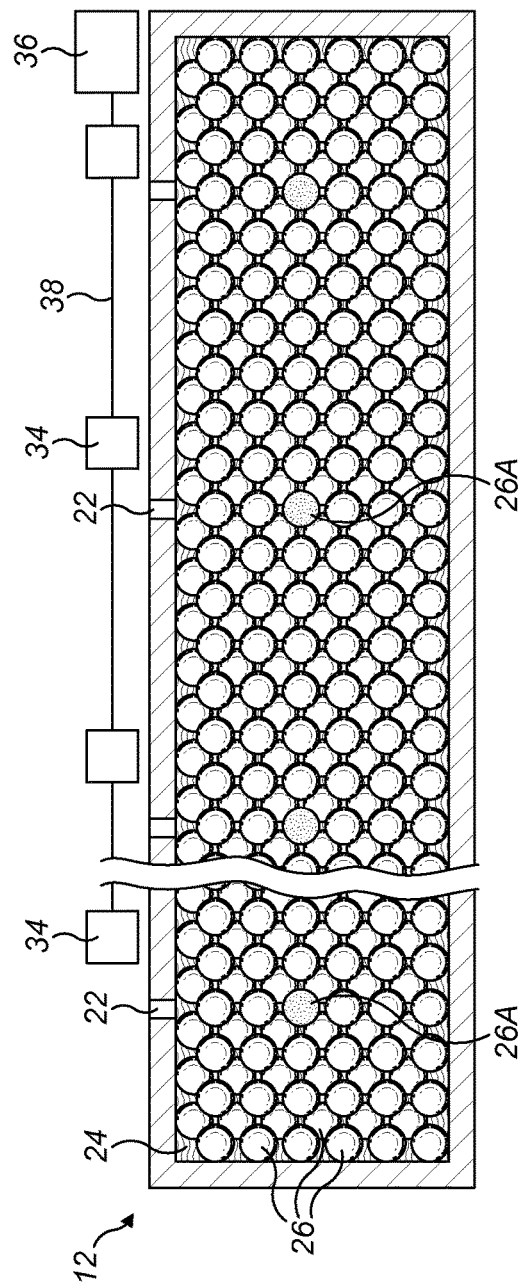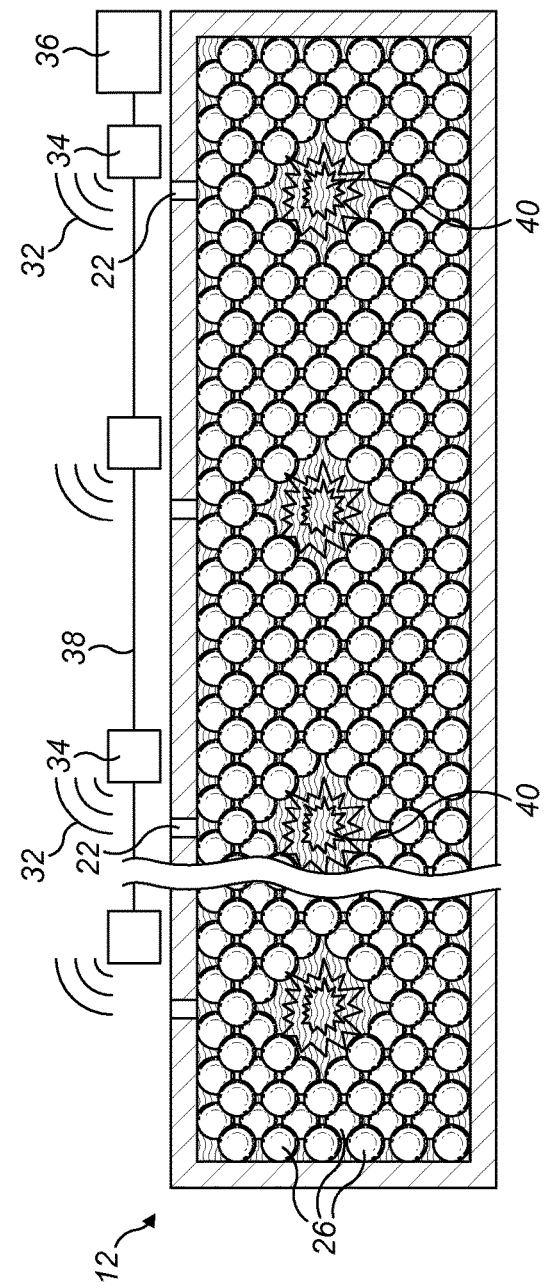

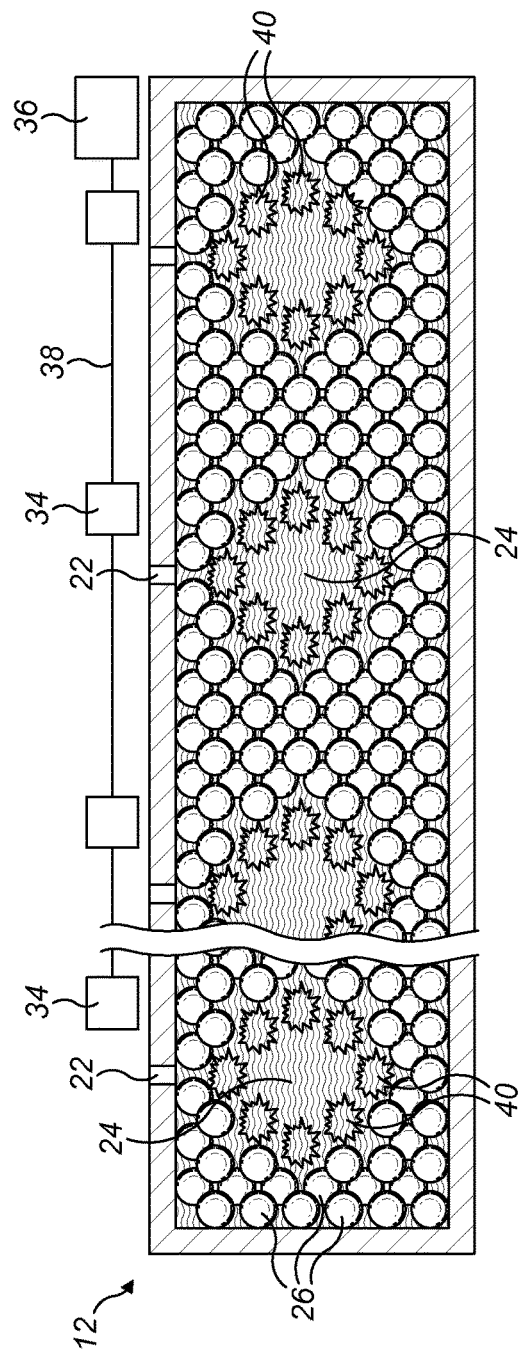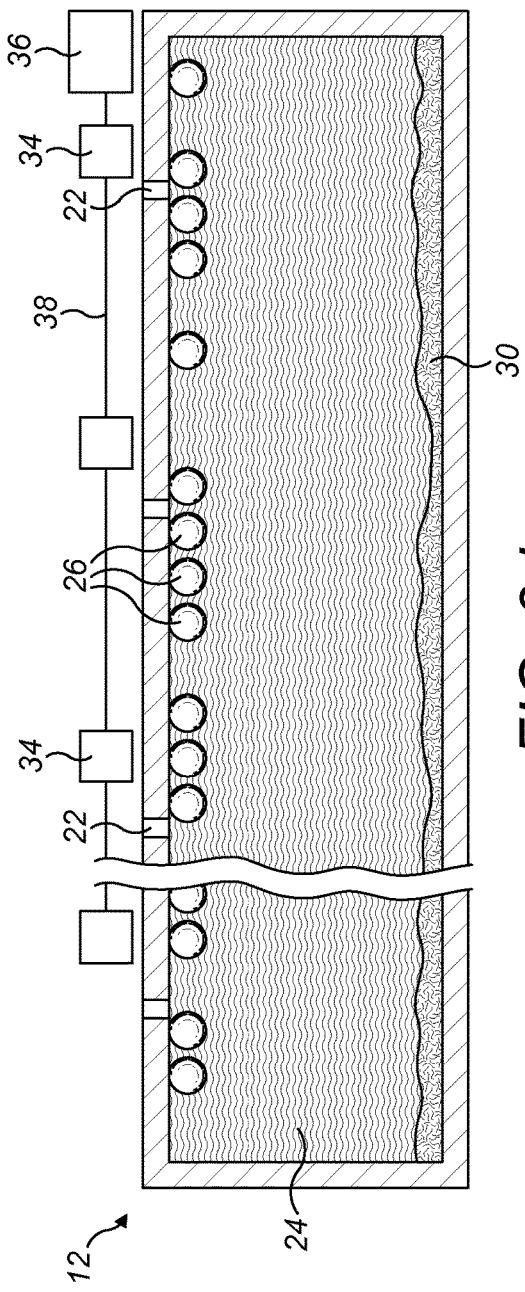
FIG. 3c
FIG. 3d

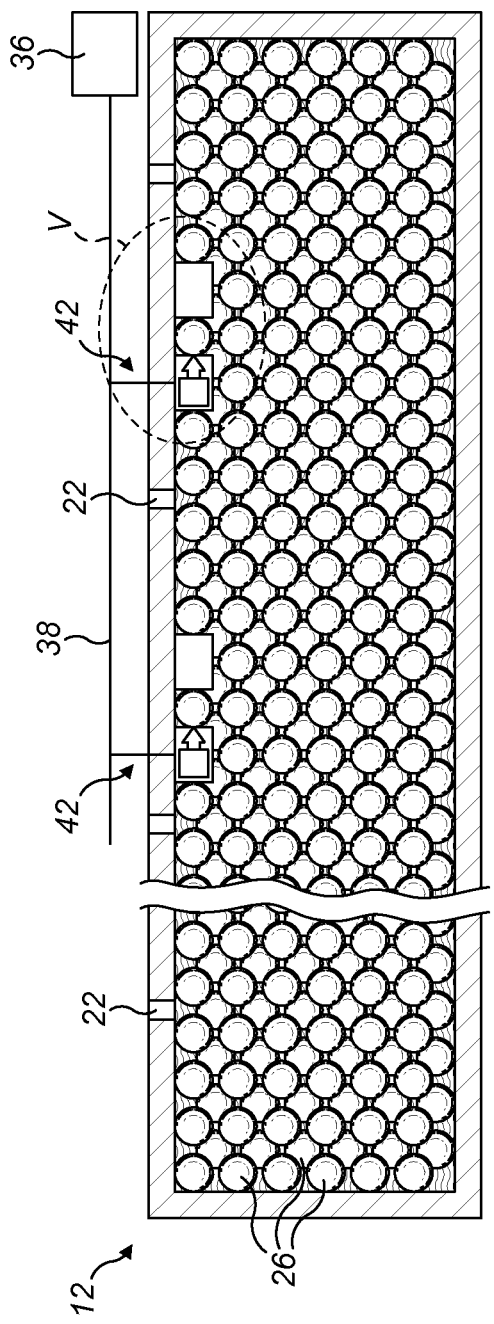
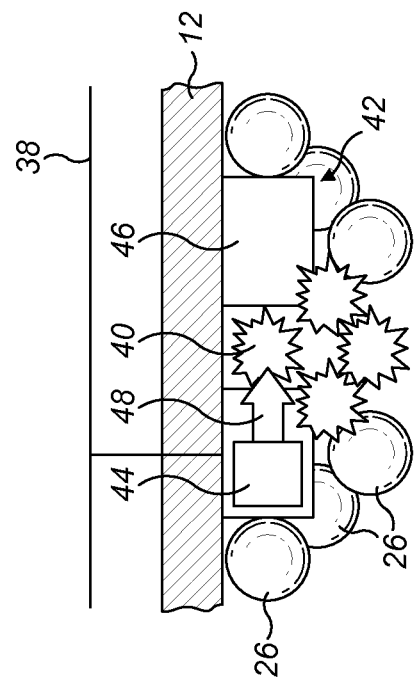
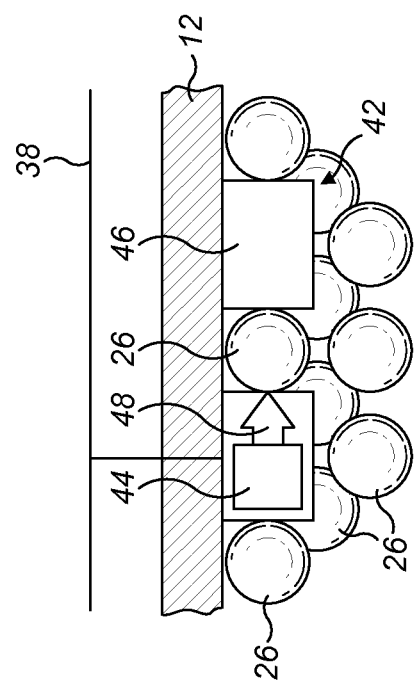

CONTROLLING THE BUOYANCY OF A MASS OF BUOYANT SPHERES

This invention relates to the control of buoyancy in subsea applications, in particular where a mass of buoyant spheres is packed into a buoyant element such as a buoyancy chamber or a buoyancy module.

The art of subsea engineering requires buoyant elements that will resist being crushed under hydrostatic pressure in use. For example, buoyant elements may be attached to or incorporated into a structure or apparatus used in the subsea oil and gas industry, such as a flowline, a riser, a pipeline bundle or an ROV.

In many subsea applications, buoyancy must be provided to a structure or apparatus only temporarily, for example as an aid for towing and installation. The buoyancy must then be removed or reduced so that the structure or apparatus can settle stably on the seabed.

A conventional way of removing or reducing buoyancy is to remove a buoyant element, for example by uncoupling a buoy or by cutting straps that attach such an element to a subsea structure or apparatus. However, removing a buoyant element is not often feasible in deep-water applications. For example, the buoyant element may be one of the pipes of a pipeline bundle, such as a core pipe, a carrier pipe or a piggy-backed pipe. In such examples, the buoyant element may be substantially more than a kilometre long. Also, the buoyant element may be integral with the bundle structure and so may not be removable at all.

Another conventional way of reducing the buoyancy of a subsea structure or apparatus is to add ballast. This may be achieved either by adding weighting equipment such as chains or clump weights to the structure or apparatus or by flooding a buoyancy tank of the structure or apparatus with a relatively dense fluid, most conveniently seawater. However, such operations can be challenging or impractical to perform, especially in deep water and on large structures.

It is known to use a gas-filled steel pipe as a buoyancy tank in shallow-water applications involving depths of up to about 200 m. Such a pipe may be used as a carrier pipe in a pipeline bundle that integrates heating, power and control systems with various flowlines for production fluids or for the injection of water, gas or chemicals. The bundle is assembled and tested onshore and is then launched and transported to its offshore location, for example using the controlled depth tow method (CDTM) that involves suspending the bundle between two tow vessels. On arrival at the installation site, once the bundle has been manoeuvred into the desired orientation, the carrier pipe is flooded to lower the bundle to the seabed and to stabilise the bundle in its final location.

The risk of crushing under hydrostatic pressure precludes the use of gas-filled buoyancy tanks in deep-water operations, which may involve depths of up to 3000 m. In principle, large buoyant elements containing gas would need such thick walls for deep-water use that their cost would be prohibitive and their buoyant uplift would be offset substantially by their weight.

As a result of these challenges, it is well known to provide buoyancy in deep water using a granular mass of buoyant spheres or beads. Buoyant spheres typically have a rigid spherical wall or shell of glass, ceramics, metal, polymer or composites surrounding a lightweight core or a hollow interior that contains a gas such as air or nitrogen.

Buoyant spheres may, for example, be used in syntactic foams having a binary composite structure that comprises hollow rigid microspheres, micro-balloons or beads embedded in a rigid matrix. Such microspheres typically have an outer diameter of substantially less than 1 mm, say 10 µm to 200 µm. They have a specific gravity that is low enough and a volume fraction that is high enough, in bulk, to confer substantial positive buoyancy on a body of syntactic foam into which they are incorporated. By way of example, buoyant spheres of glass are sold in bulk by 3M™ as 'Glass Bubbles', in various grades.

It is also known for syntactic foams to contain macrospheres that have a typical outer diameter in a range from about 5 mm to about 50 mm or more, but usually greater than 10 mm. Macrospheres typically comprise a rigid shell of epoxy resin that may include reinforcing elements such as chopped glass fibres or carbon fibres. This enables them to sustain the hydrostatic pressure of deep water up to say 3000 m, equating to a pressure of approximately 300 bar in seawater. The shell may be supported on a solid or hollow lightweight core as exemplified by the teaching of FR 2572986. Some syntactic foams comprise a mixture of microspheres and macrospheres.

The exemplary dimensions of microspheres and macrospheres set out above are given for ease of understanding and are not intended to be limiting. Nor is it essential that buoyant spheres or beads must be perfectly spherical. However, substantial sphericity is an advantage to maximise resistance to crushing, to minimise material usage and to simplify packing.

Syntactic foam is just one example of the use of a granular mass of buoyant spheres. For example, buoyant spheres can be supported in a liquid—providing what is known in the art as 'liquid buoyancy'—or surrounded by a gas. Buoyant spheres can be held in a rigid buoyancy tank or in a flexible bag. More generally, it is possible for a buoyant element to contain macrospheres with substantially no matrix in the interstitial voids between them. Where there is no matrix, the macrospheres are held together as a granular bulk material in an envelope, such as a pipe or a bag, that can be fastened to, or built into, a subsea structure or apparatus.

The envelope preferably holds the macrospheres in a tightly-packed configuration to maximise the packing factor, expressed as a percentage of the internal volume that is occupied by macrospheres. For example, vibrating a mass of substantially identical macrospheres to settle them into relatively stable arrays within an envelope can achieve a packing factor in excess of 60%, even approaching 70%.

A rigid envelope containing macrospheres could be sealed like a buoyancy tank to retain a gas in the voids between the macrospheres. In that case, the macrospheres will support the envelope and will provide secondary buoyancy in the event that the envelope is ever flooded. However, if the macrospheres are packed closely in the envelope to minimise voids between them, the gas in the envelope cannot occupy more than 30% to 40% of the internal volume. Consequently, ballasting by flooding the fraction of the internal volume that was previously occupied by the gas may not add sufficient weight to stabilise a subsea structure or apparatus on the seabed.

A problem of sealing a rigid, gas-containing envelope is that, like a buoyancy tank, the walls of the envelope must be thick and rigid and hence too costly and heavy for deep-water applications. Preferably, therefore, the envelope has openings, holes, perforations or porosity so as to admit seawater into its interior to flood the voids between the macrospheres. This means that the envelope does not need to resist hydrostatic pressure and so can be thin, light and inexpensive, and may be either rigid or flexible. As an example of this approach, JP 4983003 discloses a rigid tank containing macrospheres and makes provision for seawater to circulate around the macrospheres in the tank.

Where the interior of an envelope surrounding a mass of macrospheres is flooded, buoyant upthrust will arise from displacement of seawater corresponding to the aggregate external volume of the macrospheres within the envelope. Upthrust forces are transferred from the macrospheres to the surrounding envelope and from there to the subsea structure or apparatus to which the envelope is attached, or into which the envelope is incorporated.

As the unoccupied space within a flooded envelope containing a mass of macrospheres will be filled by seawater, the packing factor determines the aggregate buoyancy of a buoyant element comprising an envelope of a given size. A high packing factor enables a relatively small and inexpensive envelope to hold enough macrospheres to provide a desired degree of buoyancy.

Using buoyant spheres within a flooded envelope enables the benefits of pipeline bundles to be extended to deep-water applications. For example, a bundle may comprise a buoyant element in the form of a buoyancy pipe that is filled with macrospheres. The various other pipes and cables of the bundle may be held relative to each other by transverse guide frames spaced along the buoyancy pipe. Typically, stability requires the buoyancy pipe to lie above the various flowlines in the bundle.

The macrospheres in the buoyancy pipe provide the buoyancy required for towing the bundle from an assembly yard to an installation site. The buoyancy pipe has holes to allow free water circulation to flood the voids around the macrospheres and so to preclude collapse of the pipe under hydrostatic pressure. Thus, the buoyancy pipe may be of lightweight polymer or fibre-reinforced polymer composites.

Unfortunately, a buoyant element having a flooded envelope containing buoyant spheres provides no convenient way of reducing buoyancy when required. Either the buoyant element must be released from the associated subsea structure or apparatus, which is usually impractical as explained above, or the buoyant spheres must be released from the envelope. An example of the latter approach is disclosed in U.S. Pat. No. 3,605,670, in which buoyant spheres are expelled from an envelope by flushing with seawater. However, this has the environmental drawback of releasing the spheres into the sea. The same is true of the method described in GB 1396496, which teaches a method of buoyancy management in which buoyant spheres contained in a petrol tank are released into the sea by opening a removable grid at an upper end of the tank once the tank has reached its final position on the seabed.

U.S. Pat. No. 4,745,860 describes a miniature toy boat for use in a naval combat game that includes a gas-filled balloon located in its hull to serve as a float. In use, the balloon may be punctured by an internal spur to cause the boat to sink. The use of a flexible balloon as a buoyancy aid would not be viable at subsea depths.

It is against this background that the present invention has been devised. In one sense, the invention provides a method of ballasting a buoyant element, which element comprises a flooded envelope containing a mass of buoyant spheres and a water-filled void extending between the spheres. The method comprises: activating a destruction device to expand the void by imploding at least one of the spheres within the envelope; and admitting additional water into the envelope to fill the expanding void. Debris of imploded spheres is preferably retained within the envelope.

The buoyant spheres are preferably hollow and gas-filled but could contain a readily-compressible lightweight solid such as a foam whose volume will reduce substantially under hydrostatic pressure when a rigid shell of the sphere fails upon implosion.

Preferably, at least one initiating shockwave is created by the destruction device within the envelope, which shockwave implodes at least one of the spheres under hydrostatic pressure to create at least one secondary shockwave that similarly implodes at least one other of the spheres. The initiating shockwave may be created by imploding at least one collapsible enclosure within the envelope, that enclosure conveniently being a sphere.

The collapsible enclosure may be imploded by applying destructive force to the enclosure, either inwardly against an external surface of the enclosure or outwardly against an internal surface of the enclosure. Another way to implode the collapsible enclosure is to apply heat to the enclosure. It is also possible to promote accelerated weakening of the enclosure relative to neighbouring spheres in the mass, for example by thinning a wall of the enclosure relative to the shells of the spheres.

The destruction device may be activated by sending a destruction signal wirelessly to the device. For failsafe operation, it is advantageous to verify the destruction signal for authenticity and only to activate the destruction device in response to an authentic destruction signal.

To ensure even and complete ballasting of the buoyant element, multiple destruction devices spaced apart within the envelope may be activated substantially simultaneously.

The inventive concept embraces a buoyant element for use in the method of the invention. The buoyant element comprises: a floodable envelope, such as a pipe, that contains a mass of buoyant spheres and a void extending between the spheres; at least one opening that penetrates the envelope, in fluid communication with the void; and at least one destruction device, arranged to destroy at least one of the spheres within the envelope in use.

The destruction device may comprise a self-destruct mechanism housed within a collapsible enclosure, such as a spherical shell that may be of similar external diameter to the buoyant spheres of the mass. In such cases, a power source for the self-destruct mechanism is suitably housed within the collapsible enclosure. Alternatively, the destruction device may comprise a destruction mechanism acting on, and external to, the collapsible enclosure. The destruction device is preferably within the envelope but may be outside the envelope.

The buoyant element of the invention may further comprise a signal receiving module configured to receive a destruction signal and a signal processing module configured to verify the authenticity of the destruction signal, to enable the destruction device only upon receiving an authentic destruction signal.

The inventive concept extends to a destruction device alone or in combination with the buoyant element. The destruction device comprises a rigid collapsible enclosure and a destruction mechanism acting on the enclosure to cause implosion of the enclosure under hydrostatic pressure in use. For example, the destruction mechanism may be a self-destruct mechanism housed within the enclosure or may be external to the enclosure.

The destruction mechanism of the destruction device may work in various ways, for example using a movable member to apply destructive force to the collapsible enclosure, or using a heating element to heat the collapsible enclosure.

In preferred embodiments, therefore, the invention provides a buoyant element for conferring buoyancy on a subsea structure or apparatus. The buoyant element comprises a floodable envelope that contains a mass of hollow spheres and a void extending between the spheres. Openings penetrate the envelope, in fluid communication with the void. One or more one destruction devices within the envelope are arranged to destroy at least one of the spheres in use.

At a desired time and location, after the envelope has been submerged and flooded to fill the void between the spheres with water, the destruction devices are activated to destroy at least one sphere, for example by creating implosive or explosive shockwaves that expand the void by sympathetic implosion of the spheres. Additional water is admitted into the envelope through the openings to fill the expanding void, thereby ballasting the buoyant element.

Thus, the invention increases the available void inside a buoyant element containing buoyant spheres by destroying at least some of the spheres and free-flooding the resulting increased void with seawater. The spheres have a stiff, solid, brittle structure and typically contain pressurised gas. Thus, if the spheres are packed sufficiently in the buoyant element and if their size is sufficiently homogeneous, a shockwave caused by the implosion of one sphere or a few spheres can lead to the destruction of a majority of the spheres of the element.

Specifically, the sudden, near-instantaneous hydrostatic collapse of one or more macrospheres in a mass held within an envelope of a buoyant element generates corresponding shockwaves that travel through the mass. At least some of those shockwaves are of sufficient strength to cause successive implosions in neighbouring macrospheres in the mass. Each successive implosion creates a further shockwave that is similarly apt to destroy one or more further neighbouring macrospheres.

Consequently, when a minority of the macrospheres in a mass are caused to implode, implosions and shockwaves will propagate, cascade or multiply through the mass as a chain reaction. This leads to the destruction of many more of the macrospheres, potentially a majority of, or even substantially all of, the macrospheres in the mass. This greatly reduces the buoyancy of the buoyant element and so allows the associated subsea structure or apparatus to settle stably on the seabed.

The propensity of the mass to behave in this way may relate to the packing factor of the macrospheres in the mass, which determines the proximity of neighbouring macrospheres to each other. This, in turn, may relate to the uniformity of the diameters of the macrospheres in the mass.

Thus, preferred embodiments of the invention provide a method to ballast a buoyant device containing macrospheres, the method comprising: filling voids of the buoyant device with a ballasting fluid, such as seawater under hydrostatic pressure; destroying at least one macrosphere so that it produces a shockwave; and continuing to fill the voids with the ballasting fluid. Filling the voids with the ballasting fluid may, for example, be continuous during the destruction step.

Destruction of at least an initial macrosphere may be achieved actively, for example by remotely activating a built-in, internal or external destruction mechanism. The destruction mechanism may involve heating at least one macrosphere, for example using an internal or external electrical heating system. Heat may weaken a wall of the macrosphere to reduce its mechanical resistance until it implodes under hydrostatic pressure. The destruction mechanism may also, or alternatively, involve activating an internal or external mechanism to abrade, pierce, cut, crush or puncture a macrosphere.

Destruction of at least an initial macrosphere may be achieved passively, that macrosphere being designed to collapse by ageing and/or creeping to produce a shockwave after a particular length of time underwater or at a given depth. Alternatively, at least an initial macrosphere may be a designed for passive destruction by collapsing at a target hydrostatic pressure to produce a shockwave.

In order that the invention may be more readily understood, reference will now be made, by way of example, to the accompanying drawings, in which:

FIG. 1 is a schematic cross-sectional view of a pipeline bundle comprising a buoyancy pipe that is filled with buoyant macrospheres and flooded with seawater in voids between the macrospheres;

FIG. 2 corresponds to FIG. 1 but shows the bundle now landed on the seabed and stabilised by destroying most of the macrospheres to ballast the buoyancy pipe with additional seawater;

FIGS. 3*a* to 3*d* are a sequence of schematic longitudinal sectional views of the buoyancy pipe of the pipeline bundle in FIGS. 1 and 2, showing a process by which the macrospheres within may be destroyed;

FIG. 4 is a longitudinal sectional view of the buoyancy pipe of the pipeline bundle in FIGS. 1 and 2, showing another way in which the macrospheres within may be destroyed;

FIGS. 5*a* and 5*b* are schematic enlarged detail views of a destruction mechanism shown as Detail V in the buoyancy pipe of FIG. 4;

FIGS. 6*a* to 6*c* are a sequence of schematic enlarged detail views of an alternative destruction mechanism for use with the buoyancy pipe of the pipeline bundle in FIGS. 1 and 2;

Figure 1:
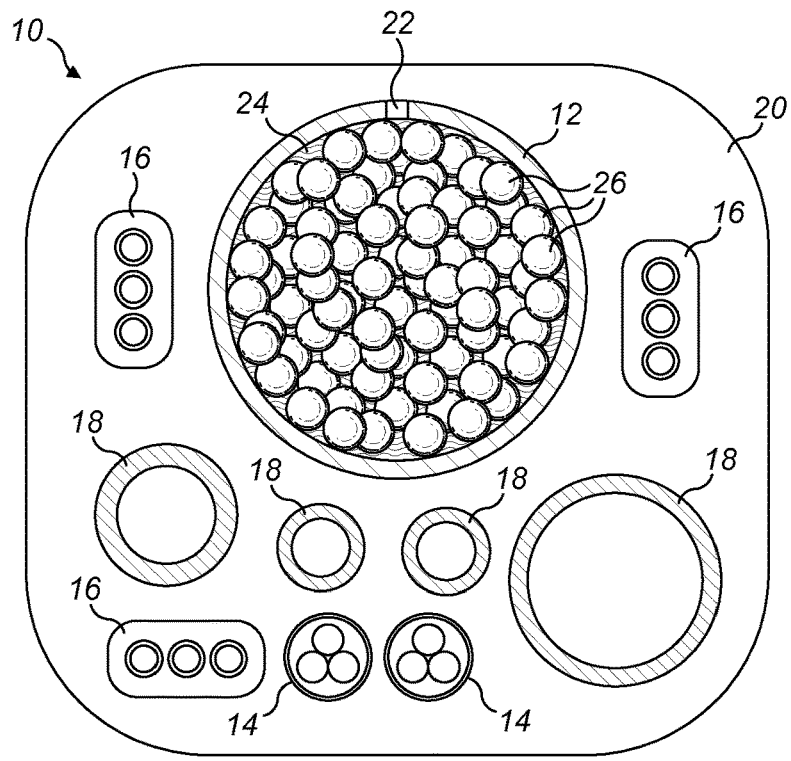
Figure 2:
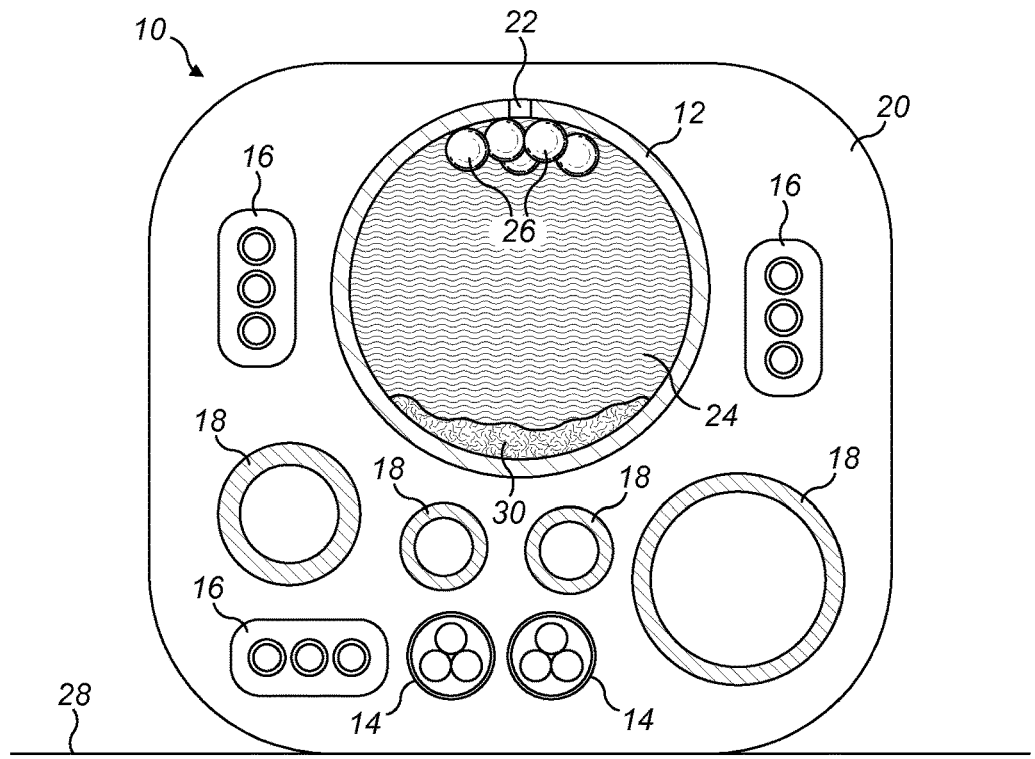

Referring firstly to FIGS. 1 and 2 of the drawings, which are much-simplified and not to scale, a pipeline bundle 10 for use in deep-water applications integrates heating, power and control systems. The bundle 10 comprises a buoyant element that, in this example, takes the form of a closed-ended buoyancy pipe 12 positioned toward an upper side of the bundle 10. The bundle 10 further comprises power cables 14, data lines 16 and various flowlines 18 for production fluids and for the injection of water, gas or chemicals, all extending generally parallel to the buoyancy pipe 12 and to each other.

One of several longitudinally-spaced transverse guide frames 20 is also shown in FIGS. 1 and 2. The guide frames 20 hold the various elongate components of the bundle 10 relative to each other with appropriate mutual transverse spacing. In practice, the shape of the guide frames 20 will be more complex than is represented schematically here.

The buoyancy pipe 12 is suitably of a polymer or of fibre-reinforced polymer composites. The use of such lightweight materials is enabled by holes 22 that penetrate the tubular wall of the buoyancy pipe 12. The holes 22 allow seawater 24 to flood the interior of the buoyancy pipe 12 to preclude its collapse under hydrostatic pressure. The holes 22 are shown here at the top of the buoyancy pipe 12 but could be distributed around its circumference.

Initially, as shown in FIG. 1, the buoyancy pipe 12 is packed with a mass of gas-filled macrospheres 26 to provide the buoyancy required to tow the bundle 10 from an assembly yard to a deep-water installation site. Even when closely packed, the macrospheres 26 leave a void in the buoyancy pipe 12 that extends between and around the macrospheres 26. The void communicates with the holes 22 to allow free circulation of seawater 24 into the buoyancy pipe 12 and between and around the macrospheres 26.

When in its final position at the installation site, the bundle 10 is settled onto the seabed 28 by destroying most or all of the macrospheres 26 in the buoyancy pipe 12 as shown in FIG. 2. Destruction of the macrospheres 26 is achieved by causing them to implode in accordance with the invention, as will be explained.

Upon their implosion, gas that was within the macrospheres 26 is instantly compressed to a negligible volume under the great hydrostatic pressure of deep water. The residual gas may also escape from the buoyancy pipe 12 through the holes 22. Either way, the gas released from the imploded macrospheres 26 ceases to contribute significant buoyancy to the buoyancy pipe 12.

Fragments of the shells of the imploded macrospheres 26 sink to the bottom of the buoyancy pipe 12, as shown, to settle as a layer of debris 30 that is substantially confined within the buoyancy pipe 12 to minimise environmental pollution. Any macrospheres 26 that may survive intact float to the top of, and are confined within, the buoyancy pipe 12. In this respect, it will be noted that the holes 22 are smaller than the macrospheres 26 so that no macrospheres 26 can escape from the buoyancy pipe 12.

As the macrospheres 26 in the buoyancy pipe 12 implode, the remaining mass of intact macrospheres 26 shrinks as the void within the buoyancy pipe 12 enlarges greatly. In consequence, seawater 24 flows into the interior of the buoyancy pipe 12 through the holes 22 to flood the enlarging void. The weight of this additional seawater 24 ballasts the buoyancy pipe 12, increasing the weight of the bundle 10 to settle the bundle 10 stably onto the seabed 28 as shown in FIG. 2.

FIGS. 3a to 3d illustrate one way of destroying macrospheres 26 massed in a buoyancy pipe 12 as used in the pipeline bundle 10 of FIGS. 1 and 2. Other elements of the bundle 10 are omitted from these drawings for clarity. In this example, self-destructing macrospheres 26A are distributed throughout the mass of macrospheres 26 packed into the buoyancy pipe 12, as shown in FIG. 3a. The self-destructing macrospheres 26A embody a destruction device within the buoyancy pipe 12 that causes many macrospheres 26 of the mass to implode, for example by initially destroying one or more macrospheres 26A. The self-destructing macrospheres 26A therefore serve as shockwave generators.

Each self-destructing macrosphere 26A contains an internal destruction system in its otherwise hollow interior, protected within its rigid spherical shell. The functionality of an internal destruction system will be described later with reference to FIG. 8 of the drawings.

In the example shown in FIGS. 3a to 3d, the internal destruction systems of the self-destructing macrospheres 26A are responsive to a destruction signal 32 transmitted wirelessly, for example acoustically or at radio frequency. The destruction signal 32 is transmitted from a series of transmitters 34 spaced along the buoyancy pipe 12, under the control of a control unit 36. The transmitters 34, the control unit 36 and their optional connecting wires 38 are suitably supported by guide frames 20 and/or by the buoyancy pipe 12 as part of the bundle 10 as shown in FIGS. 1 and 2.

When a destruction signal 32 is transmitted by the transmitters 34, the internal destruction systems of the self-destructing macrospheres 26A respond by causing those macrospheres 26A to self-destruct as shown in FIG. 3b. Specifically, the internal destruction systems cause the shells of those macrospheres 26A to fail and hence to implode under hydrostatic pressure applied by the seawater 24 inside the buoyancy pipe 12.

The resulting near-instantaneous collapse of the self-destructing macrospheres 26A generates corresponding shockwaves 40 that radiate outwardly through the seawater 24 that surrounds the macrospheres 26 in the buoyancy pipe 12. As FIG. 3c shows, those shockwaves 40 cause successive sympathetic implosions of at least some of the neighbouring macrospheres 26 in the mass. Each successive implosion creates a further shockwave 40 that is similarly apt to destroy one or more further neighbouring macrospheres 26.

Thus, shockwaves 40, resulting implosions and resulting further shockwaves 40 and implosions propagate, cascade or multiply as a chain reaction through the macrospheres 26 of the mass. Eventually a majority of the macrospheres 26 in the mass are destroyed as shown in FIG. 3d. The enlarged void containing ballasting seawater 24 now fills the majority of the interior of the buoyancy pipe 12.

Some macrospheres 26 may survive the various shockwaves 40 intact, given that the average spacing between macrospheres 26 will increase as many of them are destroyed. FIG. 3d shows that any such intact macrospheres 26 will float to the top of the buoyancy pipe 12, whereas fragments of the shells of the imploded macrospheres 26 will sink to the bottom as a layer of debris 30.

FIGS. 4, 5a and 5b show the alternative approach of an external destruction system, in which one or more destruction devices each act on the exterior of one or more macrospheres 26. The functionality of an external destruction system will be described later with reference to FIG. 7 of the drawings.

The destruction devices are exemplified in FIGS. 4, 5a and 5b as crushing devices 42 spaced at intervals along the interior of the buoyancy pipe 12, most conveniently by being mounted to a tubular wall of the buoyancy pipe 12 as shown. This positioning allows the crushing devices 42 to be connected to a control unit 36 by wires 38 or pipes that penetrate the tubular wall, to be controlled or powered hydraulically, electrically or pneumatically. However, if desired, the crushing devices 42 could instead be triggered wirelessly in a manner akin to that shown in the preceding embodiment.

Each crushing device 42 is shown in detail in FIGS. 5a and 5b. The crushing device 42 comprises relatively-movable jaws 44, 46 between which a macrosphere 26 is held as shown in FIG. 5a and may then be squeezed as shown in FIG. 5b. When squeezed between the jaws 44, 46, the macrosphere 26 fails by sudden implosion and so serves as a shockwave generator.

In this example, a movable jaw 44 is advanced toward a fixed jaw 46 to crush or puncture a macrosphere 26 positioned between the jaws 44, 46. Also, the movable jaw 44 presents a penetrating formation 48 such as an edge, a pin or a blade to the macrosphere 26. Either or both of the jaws 44, 46 may have a penetrating formation 48 to ensure rapid failure of the macrosphere 26 when the crushing device 42 is activated.

The movable jaw 44 may, for example, be driven hydraulically on receipt of a destruction signal or of a hydraulic impulse from the control unit 36. In consequence, inward external pressure from the jaws 44, 46 distorts the shell of the macrosphere 26, causing it to fail and implode under hydrostatic pressure as shown in FIG. 5b. The resulting shockwave 40 initiates a chain reaction that causes adjacent macrospheres 26 to implode and to generate further shockwaves 40 as also shown in FIG. 5b.

In principle, by relying upon chain-reaction propagation of shockwaves 40 through the mass, a single destruction device such as a single self-destructing macrosphere 26A or a single crushing device 42 could be sufficient to trigger the collapse of a majority of the macrospheres 26 in the buoyancy pipe 12. However, a plurality of destruction device distributed through the mass or along the buoyancy pipe 12 assures redundancy and helps to synchronise ballasting along the full length of the buoyancy pipe 12.

Figure 6A:
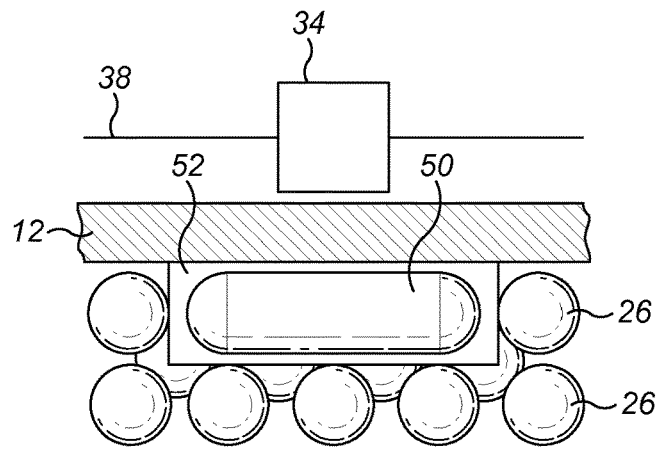
Figure 6B:
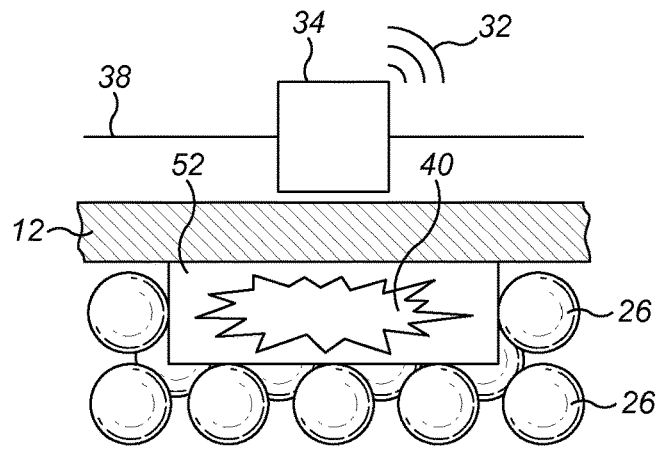
Figure 6C:
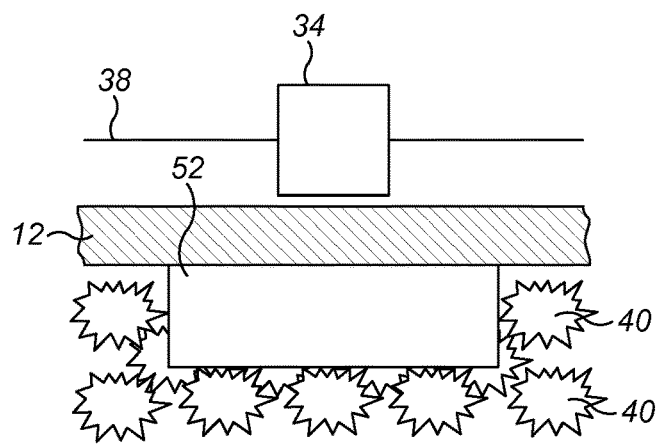

FIGS. 6a to 6c show that the cascading implosion of macrospheres 26 need not be initiated by imploding a macrosphere 26 itself: another type of shockwave generator comprising a collapsible enclosure could be used instead. In this example, a shockwave generator is embodied by an implosion cylinder 50 placed in close proximity to one or more macrospheres 26 within the buoyancy pipe 12 as shown in FIG. 6a. The implosion cylinder 50 is conveniently supported by a mount 52 attached to the tubular wall of a buoyancy pipe 12, but could lie within the mass of macrospheres 26 instead.

The implosion cylinder 50 has a pressure-resistant but, ultimately, frangible wall like that of a macrosphere 26. The wall encloses a gas-filled interior that is hollow apart from an internal destruction system akin to that used in the self-destructing macrospheres 26A of FIGS. 3a to 3d, as further exemplified in FIG. 8. The internal destruction system of the implosion cylinder 50 may also be triggered wirelessly as in the embodiment of FIGS. 3a to 3d.

FIG. 6b shows the internal destruction system of the implosion cylinder 50 triggered wirelessly by a destruction signal 32 from a transmitter 34 outside the buoyancy pipe 12. This causes the implosion cylinder 50 to collapse suddenly under hydrostatic pressure, generating a shockwave 40 that implodes the adjacent macrospheres 26 to generate further shockwaves 40 as shown in FIG. 6c.

As described in the embodiment of FIGS. 4, 5a and 5b, a shockwave generator such as an implosion cylinder 50 could be activated by an external destruction system such as a crushing device 42. As also described in the embodiment of FIGS. 4, 5a and 5b, such a shockwave generator could be activated by direct electrical, hydraulic or pneumatic connection to a control unit 36 via wires or pipes that penetrate the tubular wall of the buoyancy pipe 12.

For ease of illustration, all of the macrospheres 26 in the buoyancy pipe 12 are shown in FIGS. 3a to 6c as having the same diameter and as being packed together in a body-centred cubic array. In reality, the macrospheres 26 could differ in diameter and will pack together in a mixture of different lattice systems through the mass. However, each macrosphere 26 will be in contact with, or at least in close proximity to, more than one other macrosphere 26 of the mass.

Figure 7:
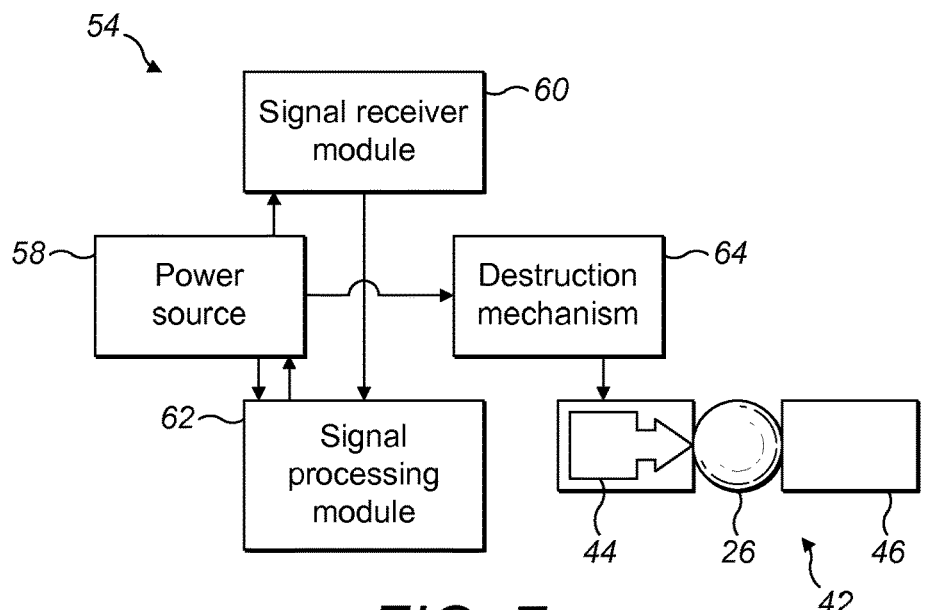
FIG. 7 is a system diagram of a destruction system that is external to a macrosphere.
Figure 8:
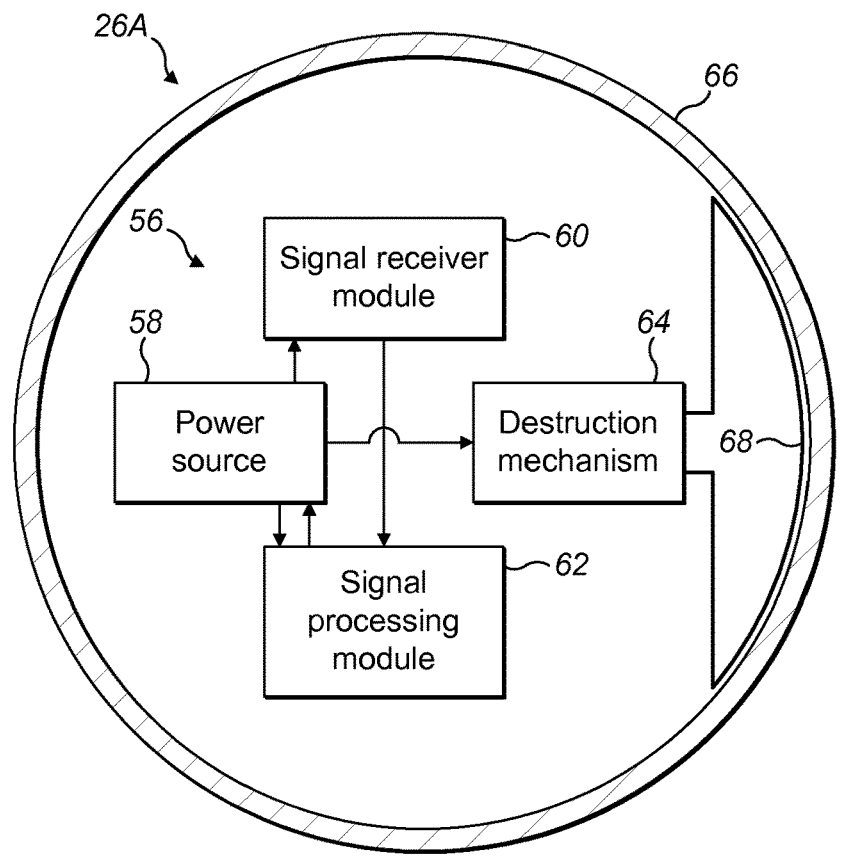
FIG. 8 is a system diagram of a destruction system that is internal to a macrosphere.

Moving on now to FIGS. 7 and 8, these system diagrams show the main functional elements of external and internal destruction systems 54, 56 respectively. Most of those elements are shared by the external and internal destruction systems 54, 56 and so will now be described in general terms.

A power source 58 provides electrical power to a signal receiver module 60 and a signal processing module 62. The signal receiver module 60 receives destruction signals and passes them to the signal processing module 62, which verifies whether the destruction signals are authentic. In this respect, failsafe operation of the destruction systems 54, 56 is essential to ensure that premature destruction of macrospheres 26 cannot occur, as this could otherwise cause a pipeline bundle 10 to sink while still in transit to an installation site.

When the signal processing module 62 verifies that a destruction signal is authentic, it enables the power source 58 to provide electrical, hydraulic or pneumatic power to activate a destruction mechanism 64 as appropriate.

The functional elements of the external destruction system 54 shown in FIG. 7 are all external to the shockwave generator exemplified here by a macrosphere 26. However, at least some of those elements may be distributed between various units such as the control unit 36 shown in FIG. 4 and external destruction devices such as the crushing device 42 shown in FIGS. 4, 5a and 5b.

Conversely, the functional elements of the internal destruction system 56 shown in FIG. 8 are all contained within a hollow gas-filled shell 66 of a shockwave generator. The shockwave generator is exemplified here by a self-destructing macrosphere 26A but could be a collapsible enclosure of another form, such as the implosion cylinder 50 shown in FIG. 6a.

In the internal destruction system 56 shown in FIG. 8, the destruction mechanism 64 is exemplified by a resistive electrical wire 68 embedded in, or otherwise in thermal contact with, the resin of the shell 66. When enabled by the signal processing module 58, the power source 58 passes an electric current along the wire 68 to effect Joule heating of the wire 68.

This, in turn, heats the adjoining resin of the shell 66, which reduces the mechanical strength of the shell 66 until it fails by implosive collapse under hydrostatic pressure of the surrounding seawater.

Figure 9:
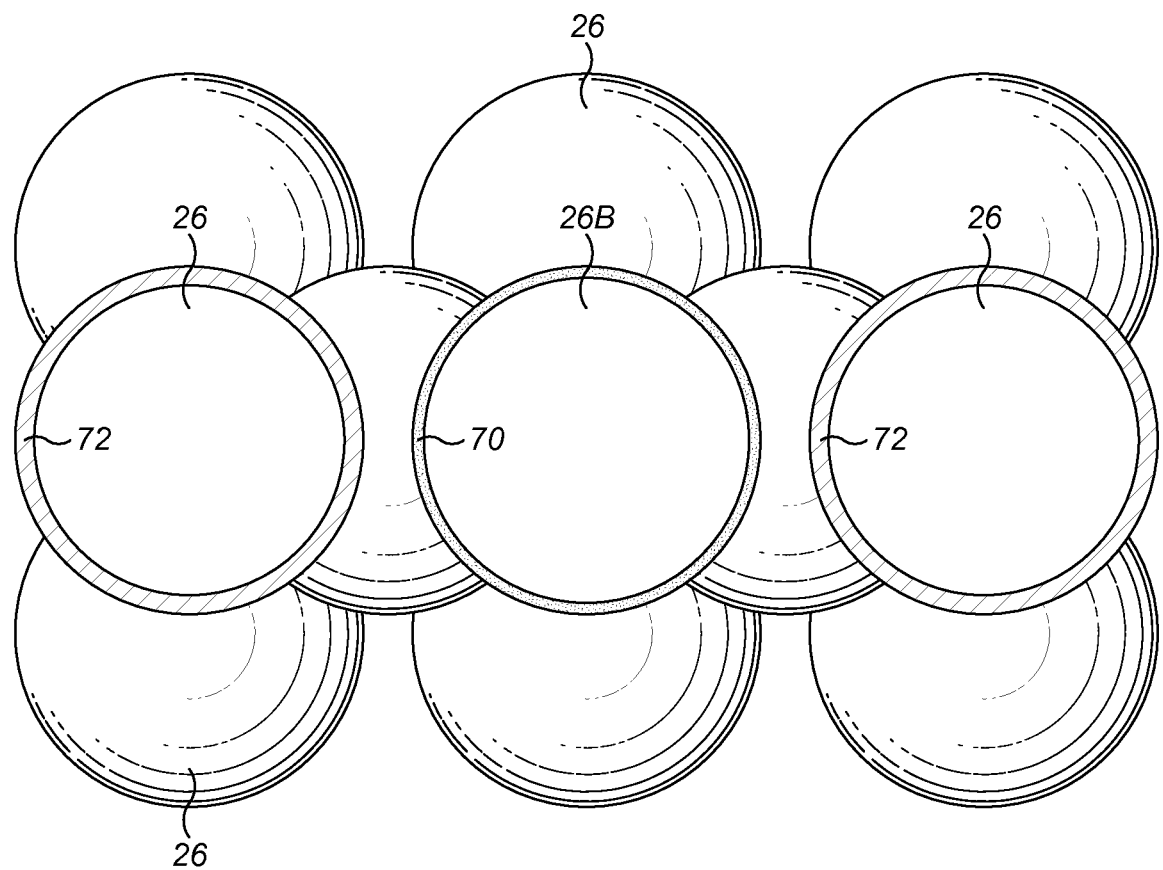
FIG. 9 is an enlarged detail view of a group of macrospheres, one of which is adapted to fail under hydrostatic pressure to initiate collapse of the adjacent macrospheres of the group.

Turning finally to FIG. 9 of the drawings, this shows a shockwave generator in the form of a modified macrosphere 26B among a group of surrounding macrospheres 26 within a buoyancy pipe 12. The shell 70 of the modified macrosphere 26B is modified to promote passive collapse at a desired stage of the installation cycle.

In this example, the shell 70 of the modified macrosphere 26B is thinner than the shells 72 of the surrounding macrospheres 26 and/or is of a different material. The characteristics of the shell 70 are selected to cause the modified macrosphere 26B to fail, for example by ageing and/or creeping, to produce a shockwave after a particular length of time underwater and/or at a given depth. That shockwave then promotes failure of the surrounding macrospheres 26 to ballast the buoyancy pipe 12 after the pipeline bundle 10 shown in FIGS. 1 and 2 has been landed on the seabed.

Some variants of the invention have been described above. Many other variations are possible within the inventive concept. For example, it would be possible for a destruction signal to be transmitted from, or initiated by, a nearby submersible vehicle such as an ROV or an AUV, or for a destruction signal to be relayed from one destruction device to another.

Destruction devices such as the self-destructing macrospheres shown evenly spaced along a central longitudinal axis of the buoyancy pipe in FIGS. 3a to 3d could, in practice, be distributed more randomly within the buoyancy pipe at various longitudinal and transverse positions.

A destruction device could generate a shockwave by explosive means, for example by triggering a small explosive charge within an envelope such as a pipe.

An internal destruction mechanism within a shockwave generator need not rely upon electrical heating but could instead drive movement of an internal member such as a plunger or a blade against a surrounding collapsible enclosure to promote failure of the enclosure. Conversely, an external destruction mechanism outside a shockwave generator could promote failure of a collapsible enclosure by heating at least a part of the enclosure.

It is preferred that the macrospheres are filled with gas but they could instead contain a liquid or a vacuum.

A closure or valve may be associated with each opening in the envelope to close and open the opening when appropriate, for example to control flooding of the envelope on immersion in seawater.

Instead of a shockwave, macrosphere collapse could be initiated in other ways. One example is resonance caused by sound waves or other vibrations. A large-amplitude sound wave, typically infrasound, could make some macrospheres resonate until they are destroyed.

The invention claimed is:

1. A buoyant element for controlling buoyancy of a subsea structure or subsea apparatus comprises:
    a floodable envelope that contains a mass of buoyancy spheres and a void extending between the spheres;
    at least one opening that penetrates the envelope, in fluid communication with the void; and
    at least one destruction device, arranged to destroy at least one of the spheres within the envelope in use, thereby ballasting the subsea structure or subsea apparatus;
    wherein the destruction device acts on a collapsible enclosure arranged to generate a shockwave upon implosion of the enclosure in water that fills the void in use, and wherein the destruction device comprises a self-destruct mechanism housed within the collapsible enclosure, wherein a power source for the self-destruct mechanism is housed within the collapsible enclosure.

2. The buoyant element of claim 1, wherein the collapsible enclosure is one of the spheres of the mass.

3. The buoyant element of claim 1, further comprising a signal receiving module configured to receive a destruction signal and a signal processing module configured to verify the authenticity of the destruction signal, to enable the destruction device upon receiving an authentic destruction signal.

4. The buoyant element of claim 1, wherein the destruction device comprises at least one movable member arranged to apply destructive force to the collapsible enclosure.

5. The buoyant element of claim 4, wherein the destruction device comprises at least one jaw that is movable toward the collapsible enclosure to apply the destructive force.

6. The buoyant element of claim 1, wherein the destruction device comprises at least one heating element arranged to heat the collapsible enclosure.

7. The buoyant element of claim 1, wherein the collapsible enclosure is configured to promote accelerated weakening of the enclosure relative to neighbouring spheres in the mass.

8. The buoyant element of claim 7, wherein a wall of the collapsible enclosure is thinner than walls of neighbouring spheres the mass.

9. The buoyant element of claim 1, wherein the envelope is defined by a pipe.

10. The buoyant element of claim 1, further comprising a closure operable to open the or each opening.

11. The buoyant element of claim 1, wherein the destruction device is explosive.

12. A method of ballasting a buoyant element of a subsea structure or subsea apparatus, which element comprises a flooded envelope containing a mass of buoyancy spheres and a water-filled void extending between the spheres, the method comprising:
    activating a destruction device to expand the void by imploding at least one of the spheres within the envelope, the destruction device comprising a self-destruct mechanism housed within at least one collapsible enclosure, and a power source for the self-destruct mechanism being housed within the collapsible enclosure;
    creating at least one initiating shockwave within the envelope by imploding the at least one collapsible enclosure within the envelope by applying destructive force outwardly against an internal surface of the enclosure, which shockwave implodes at least one of the spheres to create at least one secondary shockwave that implodes at least one other of the spheres; and
    admitting additional water into the envelope to fill the expanding void, thereby ballasting the subsea structure or subsea apparatus.

13. The method of claim 12, comprising creating the initiating shockwave by imploding at least one of the spheres.

14. The method of claim 12, comprising creating the initiating shockwave by exploding the destruction device.

15. The method of claim 12, comprising activating the destruction device by sending a destruction signal wirelessly to the device.

16. The method of claim 12, comprising verifying a destruction signal for authenticity and activating the destruction device in response to an authentic destruction signal.

17. The method of claim 12, comprising retaining debris of imploded spheres within the envelope.

18. The method of claim 12, comprising activating multiple destruction devices spaced apart within the envelope, each destruction device causing the implosion of at least one adjacent sphere of the mass.

19. A destruction device for ballasting a subsea structure or subsea apparatus, the device comprising:
    a rigid collapsible enclosure and a destruction mechanism acting on the enclosure to cause implosion of the enclosure under hydrostatic pressure in use thereby ballasting the subsea structure or subsea apparatus, wherein the destruction mechanism is a self-destruct mechanism housed within the collapsible enclosure;
    wherein a power source for the self-destruct mechanism is housed within the collapsible enclosure; and
    wherein the self-destruct mechanism comprises at least one movable member arranged to apply a destructive force to the collapsible enclosure or at least one heating element arranged to heat the collapsible enclosure.

* * * * *